United States Patent
Syrjälahti et al.

(12) 
(10) Patent No.: US 10,347,097 B2
(45) Date of Patent: *Jul. 9, 2019

(54) PLUG FOR DETECTING TAMPERING OF CONTAINER

(71) Applicant: Enevo Oy, Espoo (FI)

(72) Inventors: Mikko Syrjälahti, Espoo (FI); Pirkka Palomaki, Helsinki (FI); Fredrik Kekäläinen, Espoo (FI)

(73) Assignee: ENEVO OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,162

(22) Filed: Oct. 31, 2018

(65) Prior Publication Data

US 2019/0066465 A1 Feb. 28, 2019

Related U.S. Application Data

(63) Continuation of application No. 15/236,856, filed on Aug. 15, 2016, now Pat. No. 10,147,285.

(51) Int. Cl.
| | |
|---|---|
| *G08B 13/14* | (2006.01) |
| *G08B 13/02* | (2006.01) |
| *G01F 23/00* | (2006.01) |
| *B65D 39/08* | (2006.01) |

(52) U.S. Cl.
CPC ............ *G08B 13/02* (2013.01); *B65D 39/08* (2013.01); *G01F 23/00* (2013.01); *B65D 2101/00* (2013.01); *B65D 2203/10* (2013.01)

(58) Field of Classification Search
None
See application file for complete search history.

(56) References Cited

U.S. PATENT DOCUMENTS

| | | | | |
|---|---|---|---|---|
| 4,717,914 A * | 1/1988 | Scott | ......................... | H04L 5/22 370/451 |
| 8,083,089 B2 * | 12/2011 | Vovan | .................. | B65D 43/162 220/270 |
| 8,286,817 B2 * | 10/2012 | Wilson | ............... | B65D 47/0828 220/254.2 |
| 2017/0058565 A1 * | 3/2017 | Sanchez | ................ | E05B 45/061 |

* cited by examiner

*Primary Examiner* — Adolf Dsouza
(74) *Attorney, Agent, or Firm* — Ziegler IP Law Group, LLC

(57) ABSTRACT

A plug for detecting tampering of a container is configured to close an opening of the container. The plug includes an attachment device for attaching the plug to the opening of the container, a motion sensor for sensing rotation of the plug with respect to the container, a communication device for communicating with a server, a microcontroller unit and a memory unit. The microcontroller unit is configured to compare a sensed rotation of the plug to a service schedule stored in the memory and detect the tampering of the container based on the comparison.

17 Claims, 2 Drawing Sheets

400

DETECT ROTATION OF A PLUG WITH RESPECT TO A CONTAINER
402

COMMUNICATE THE DETECTED ROTATION OF THE PLUG TO A SERVER
404

COMPARE THE DETECTED ROTATION OF THE PLUG TO A SERVICE SCHEDULE OF THE CONTAINER
406

GENERATE AN ALERT IF THE DETECTED ROTATION OF THE PLUG DIFFERS FROM THE SERVICE SCHEDULE OF THE CONTAINER
408

PLUG FOR DETECTING TAMPERING OF CONTAINER

TECHNICAL FIELD

The aspects of the disclosed embodiments relate generally to tamper-evident technology, and more specifically to a plug for detecting tampering of a container.

BACKGROUND

In the recent past, the use of sensors for various real-life applications has rapidly increased due to developments and improvements in technology. Nowadays, sensors are widely used for a number of applications such as distance measurement, temperature measurement, velocity measurement, and so forth. Additionally, there may be some applications, such as fill level measurement, which require sensors to be placed on containers. Specifically, the sensor may be mounted on a lid of the container to sense a fill of items contained in the container. Such sensors may be susceptible to tampering and/or theft. The tampering of the container is typically undesirable, and may have severe consequences.

Conventionally, there exists mechanical means such as clamps, brackets, and so forth, to secure and to avoid tampering of sensors (mounted on containers). Further, a limit switch may be used to restrict movement of sensors past a predetermined limit. Specifically, the limit switch may be used to determine the presence or absence of a sensor with respect to a container depending on contact of the sensor with an actuator of the limit switch. Therefore, the limit switch cannot be used for remote monitoring for tampering of containers. Also, mechanical parts in limit switches may wear out with use over a period of time.

Therefore, in light of the foregoing discussion, there exists a need to overcome the aforementioned drawbacks associated with tampering of containers.

SUMMARY

The present disclosure seeks to provide a plug for detecting tampering of a container. The present disclosure also seeks to provide a system for detecting tampering of a container. Moreover, the present disclosure seeks to provide a method for detecting tampering of a container. The present disclosure seeks to provide a solution to the existing problems in detection of tampering of a container. An aim of the present disclosure is to provide a solution that overcomes at least partially the problems encountered in prior art, and provides a robust and reliable solution for detecting tampering of a container.

In one aspect, an embodiment of the present disclosure provides a plug for detecting tampering of a container, the plug being adapted to close an opening of the container, the plug comprising
  attachment means for attaching the plug to the opening of the container by rotating the plug with respect to the container,
  a motion sensor for sensing rotation of the plug with respect to the container, and
  communication means for communicating with a server.

In another aspect, an embodiment of the present disclosure provides a system for detecting tampering of a container, the system comprising
  a plug for closing an opening of the container, the plug comprising
    attachment means for attaching the plug to the opening of the container by rotating the plug with respect to the container,
    a motion sensor for sensing rotation of the plug with respect to the container, and
    communication means, and
  a server comprising
    communication means for communicating with the plug,
    a database comprising a service schedule of the container, and
    an analysing unit for analysing sensor data and the service schedule.

In yet another aspect, an embodiment of the present disclosure provides a method for detecting tampering of a container, the method comprising
  detecting rotation of a plug with respect to the container, the plug comprising
    attachment means for attaching the plug to the opening of the container by rotating the plug with respect to the container,
    a motion sensor for sensing rotation of the plug with respect to the container, and
    communication means,
  communicating the detected rotation of the plug to a server,
  comparing the detected rotation of the plug to a service schedule of the container, and
  generating an alert if the detected rotation of the plug differs from the service schedule of the container.

Embodiments of the present disclosure substantially eliminate or at least partially address the aforementioned problems in the prior art, and enable reliable detection of tampering of a container.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
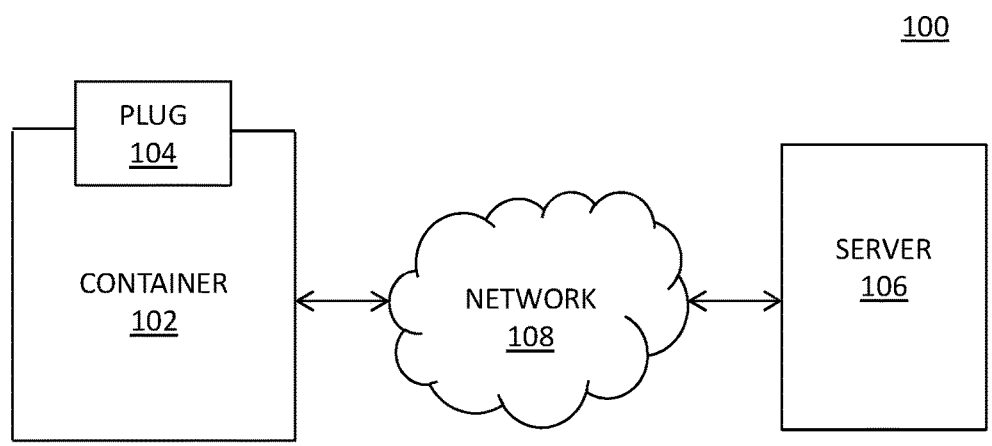
FIG. 1 is a block diagram of a system for detecting tampering of a container, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a plug for detecting tampering of a container, the plug being adapted to close an opening of the container, the plug comprising
  attachment means for attaching the plug to the opening of the container by rotating the plug with respect to the container,
  a motion sensor for sensing rotation of the plug with respect to the container, and
  communication means for communicating with a server.

In another aspect, an embodiment of the present disclosure provides a system for detecting tampering of a container, the system comprising
  a plug for closing an opening of the container, the plug comprising
    attachment means for attaching the plug to the opening of the container by rotating the plug with respect to the container,
    a motion sensor for sensing rotation of the plug with respect to the container, and
    communication means, and
  a server comprising
    communication means for communicating with the plug,
    a database comprising a service schedule of the container, and
    an analysing unit for analysing sensor data and the service schedule.

In yet another aspect, an embodiment of the present disclosure provides a method for detecting tampering of a container, the method comprising
  detecting rotation of a plug with respect to the container, the plug comprising
    attachment means for attaching the plug to the opening of the container by rotating the plug with respect to the container,
    a motion sensor for sensing rotation of the plug with respect to the container, and
    communication means,
  communicating the detected rotation of the plug to a server,
  comparing the detected rotation of the plug to a service schedule of the container, and
  generating an alert if the detected rotation of the plug differs from the service schedule of the container.

The present disclosure provides a plug, a system and a method for detecting tampering of a container. The plug described in the present disclosure includes at least one motion sensor for remotely detecting rotation of the plug. Therefore, the likelihood of tampering detection using the plug is very high. Moreover, the system of the present disclosure provides a more robust and reliable solution as compared to conventional means (such as limit switches) for detecting tampering of the container. Also, the system and method described in the present disclosure are cost effective, scalable, and simple to implement.

In an embodiment, the plug further comprises a fill level sensor for sensing the fill level of the container. This sensor would thus enable monitoring the fill level of the container, and to thus check whether the container has been emptied or whether something has been added to the container.

In an embodiment, the container is a vessel including a hollow body for collection of items therein. The container may also include a lid to at least partially cover the container. For example, the lid may be used to cover the container from top. Further, the container may be of various shapes and sizes. In an embodiment, the container may be a garbage collection container. In such embodiment, the container may be used for collection of garbage, such as recyclable waste material, kitchen waste, plastics, and so forth. Further, the container may be placed in a particular locality for collection of garbage in and around the particular locality. The container may also be a container for liquids, such as a tank, equipped with a rather small opening in which the plug is arrangeable.

The container includes a plug adapted to close an opening of the container. The opening of the container may be present on any surface of the container, such as on the sides of the container. In an embodiment, the opening of the container may be present on the lid on top of the container. In another embodiment, the opening of the container may be present on a bottom surface of the container.

In an embodiment, the plug may be of various shapes and sizes. For example, the plug may be of a shape and size such that the plug fits snugly with the opening of the container. Further, the plug may be a housing including electrical, mechanical and computing units such as sensors, memory, batteries and so forth.

The plug may comprise a fill level sensor for sensing the fill level of the container. Specifically, the fill level sensor may be used for determination of a fill level of items (for example garbage or liquid) within the container. For example, a fill level sensor may be used for determination of fill level of waste in a container for emptying the container when required. In another example, the fill level sensor may measure weight of fill in a container.

According to an embodiment, the fill level sensor may be at least one of an ultrasonic sensor, an infrared sensor, a pressure sensor, a weight sensor, an ultra wideband radar sensor, a camera sensor and a laser sensor. It may be evident that use of the pressure sensor and/or the weight sensor as the fill level sensor for sensing the fill level of the container may require the pressure sensor and/or the weight sensor to be mounted at the bottom surface of the container.

The plug further comprises attachment means for attaching the plug to the opening of the container by rotating the plug with respect to the container. In an embodiment, the attachment means may be threads or a turnlock. When the attachment means is threads, the opening in the container is equipped with fitting threads.

In an embodiment, the attachment means attaches the plug to the opening by rotation of the plug by an angle with respect to the container. For example, the threads (attachment means) attach the plug to the opening of the container by rotating the plug with respect of the container for at least 180 degrees. In another example, the plug may be rotated by an angle other than 180 degrees (such as 150 degrees, 360 degrees, and so forth) for attachment. In such embodiment, a surface defining the opening of the container may include complementary threads adapted to attach the plug to the opening of the container. In one embodiment, threads may be one of a metric, square, acme and the like.

In an embodiment, the attachment means (such as the turnlock) attaches the plug to the opening by rotating the plug with respect of the container for at least 90 degrees.

In an embodiment, the plug may comprise attachment means for attaching the plug to the opening of the container by a mechanism other than rotation of the plug with respect to the container. For example, the attachment means may be a snap-fit arrangement or the plug may be snugly fit by linearly inserting the plug into the opening of the container for attachment, while detachment of the plug will require the plug to be rotated.

The plug includes a motion sensor for sensing rotation of the plug with respect to the container. In an embodiment, the motion sensor is at least one of an accelerometer, a magnetometer, and a gyroscope. Specifically, the motion sensor may be a device adapted to detect movement (such as rotation, linear displacement, and so forth) of the plug with respect to the container. Therefore, the motion sensor may facilitate detection of tampering of the container. The motion sensor is configured to sense rotational movement of the plug with respect to the container. The motion sensor may be configured to sense movement in other directions, such as linear movement with respect to the container. Typically thus the plug is designed for a given type of container and its opening.

In an embodiment, the plug may include more than one motion sensor for reliable detection of tampering of the container. In an embodiment, the accelerometer (the motion sensor) may be an electromechanical device capable of measuring of motion, such as acceleration subject to the plug. The accelerometer may be a single axis or a multi-axis model. For example, the accelerometer of the plug may be a 6-axis accelerometer.

In an embodiment, the accelerometer may be used for measurement of acceleration associated with the plug due to at least one of gravity, tilting of the plug, movement of the plug, vibration of the plug, and so forth. Therefore, the motion of the plug may correspond to an acceleration value for the plug. Further, the values of acceleration, and/or trends in the acceleration values may be used for tampering detection. For example, if acceleration values over a period of time deviate from commonly observed trends in acceleration values over that time, the detected motion of the plug may indicate tampering of the container. In another example, if the acceleration value of the plug does not lie within an acceptable range of acceleration values, the detected motion of the plug may indicate tampering of the container.

In other embodiments, the magnetometer and the gyroscope values may be similarly associated with the movement of the plug for tampering detection.

In one embodiment, the motion sensor is further configured to sense linear movement of the plug with respect to the container. The linear movement may be in a direction essentially perpendicular to a plane defined by the rotation of the plug with respect to the container. In another embodiment, the linear movement may be in any other direction, for example, a direction parallel to a plane defined by the rotation of the plug with respect to the container.

In this description, collective data related to the fill level sensor (such as level of fill), and to the motion sensor (such as acceleration, displacement, and so forth), may be hereinafter generally referred to as "sensor data".

The plug for detecting tampering of the container comprises communication means for communicating with a server. Specifically, the communication means of the plug may include hardware, software, firmware, or combination of these, suitable for transmitting and/or receiving communication over a network. For example, the communication means of the plug may be a transceiver unit. It may be evident that the communication means of the plug are preferably compatible with a communication means of the server, in order to facilitate communication therebetween. In an embodiment, the communication means of the plug may be suitable for communication over networks such as, but not limited to, cellular network, short range radio, and Low-Power Wide-Area Network (LPWAN).

In an embodiment, the plug further comprises a power source. Specifically, the power source provides electrical power to electrical and computing units within the plug, such as, the optional fill level sensor, the motion sensor, and the communication means. For example, the power source may be an industrial grade lithium battery. Additionally, the power source may also be used to transfer electrical power to a microcontroller unit and a memory unit in the plug.

In an embodiment, the plug further comprises a microcontroller unit for controlling the optional fill level sensor, the motion sensor and the communication means. Specifically, the microcontroller unit may be a device containing a processor unit, an integrated memory, Input/Output units, parameterized programs, and so forth. The microcontroller unit may send instructions for operation of the fill level sensor, the motion sensor, and the communication means, and accordingly communicate data therewith. When the plug comprises other parts requiring control, such as further sensors and the power source, the same microcontroller is typically used for controlling also these parts.

In an embodiment, the plug may also include a memory unit. Specifically, the memory unit may include a single or multiple modules or devices including hardware, software, firmware, or combination of these to store data. Further, the memory may be configured to store sensor data received by the microcontroller unit and/or other data related to the container (such as capacity of the container, location of the container, and so forth).

In an embodiment, the server may receive sensor data from the plug. The server comprises communication means for communicating with the plug. It may be understood that communication means of the server are compatible with the communication means of the plug, and the type of network (such as short range radio). In an embodiment, the communication means of the server may be suitable for communication over networks such as, but not limited to, cellular network, short range radio, and Low-Power Wide-Area Network (LPWAN).

The server further comprises a database having a service schedule (as described above) of the container. In an embodiment, the term 'service schedule' used herein refers to an organized plan for service events related to the container. Specifically, the service schedule may include a list of scheduled times for emptying or moving or cleaning the container. For example, a service schedule for a garbage container may include details such as scheduled dates and times for emptying the garbage container, name and identification details of a service personnel responsible for emptying the garbage container, registration number of a service vehicle and so forth. Additionally, the service schedule may also include any additional details related to the container. For example, the service schedule may include details related to storage capacity of the container, weight of items within the container, and so forth. In an embodiment, the service schedule may be fixed. For example, a service schedule for a garbage container may include a schedule for emptying the garbage container every day at 3 p.m. In an alternative embodiment, the service schedule may be dynamic and may be prepared dynamically according to the fill level of the container, and/or a route map (or itinerary) of a service vehicle.

The server further comprises an analysing unit for analysing sensor data and the service schedule. Specifically, the server may be a hardware, software, firmware or combination of these, configured to communicate with the plug through the network for analysing data associated with the sensors of the plug.

In an embodiment, the analysing unit may include hardware, software, firmware or combination of these for analysing sensor data and the service schedule of the container. The analysis of sensor data and the service schedule includes, but is not limited to, comparison of the sensor data and the service schedule, managing the service schedule, estimation of trends in sensor data, and so forth.

According to an embodiment, the server is configured to compare the sensed rotation of the plug to a service schedule. Specifically, the analysing unit may compare the sensed motion of the plug (such as rotation, linear movement, and so forth) to the service schedule, for detecting tampering of the container. The comparison of the sensed motion of the plug to the service schedule highlights any deviations (or differences) in the sensed motion of the plug versus pre-planned (or anticipated) motions of the plug according to the service schedule. For example, for a container emptying event at 8 a.m. on a particular day, a motion of the plug between 7:45 a.m. and 8:15 a.m. may constitute a pre-planned motion of the plug according to the service schedule. However, a motion of the plug at 6 a.m. on the particular day indicates a deviation in pre-planned motion of the plug, and therefore may relate to tampering of the container. In one embodiment, the comparison of the sensed motion of the plug to the service schedule may be performed using a suitable means (such as a comparator device, or a comparison module) integrated within the analysing unit.

In an embodiment of the present disclosure, the analysing unit may also be configured to dynamically prepare the service schedule of the container according to the fill level of the container, and/or a route map (or itinerary) of the service vehicle.

In operation, the system of the present disclosure may be used for detecting tampering of the container. The rotation of a plug (as described above) with respect to the container may be detected. Specifically, the motion sensor may be used for detecting rotation of the plug with respect to the container. Thereafter, the detected rotation of the plug may be communicated to a server (as described above). Specifically, the communication means of the plug may communicate the detected rotation of the plug to the server through a network. Further, the detected rotation of the plug may be compared to a service schedule of the container. In an embodiment, the server is configured to compare the sensed rotation of the plug to a service schedule. Specifically, the analysing unit of the server compares the sensed rotation to the service schedule. Thereafter, an alert is generated if the detected rotation of the plug differs from the service schedule of the container.

In an embodiment, generation of the alert may include, but is not limited to, flashing a light on the container, activating a buzzer on the container, sending a multimedia message to the nearest service personnel or service vehicle, and so forth. In an embodiment, the analysing unit of the server may generate the alert in co-operation with the communication means of the server. In an example, the analysing unit of the server may generate a text message alert to be sent to a service personnel. In another embodiment, the microcontroller unit of the plug may generate the alert in co-operation with the communication means of the plug.

In one embodiment, the fill level sensor is configured to authenticate the service schedule. Specifically, the fill level sensor may be configured to sense fill level of items within the container to authenticate occurrence of events (such as emptying, cleaning, or moving of the container) specified in the service schedule.

For example, a container emptying event at 3 pm may be authenticated by the fill level sensor by sensing of fill level before and after 3 pm Specifically, if the fill level after 3 pm is less as compared to the fill level before 3 pm, motion of the plug during the container emptying event may not indicate tampering of the container.

In another example, if the service schedule specifies that a garbage container be moved from one place to another at a particular time, a constant fill level measured by the fill level sensor may authenticate movement of the container. In such instance, the motion sensor data corresponding to such movement of the plug, may not indicate tampering of the container.

In an example, the communication means of the plug may detect presence of service personnel, and may authenticate the service schedule. Specifically, the communication means may detect presence of the service personnel by detecting a communication device of the service personnel based on the service schedule. For example, if a Bluetooth device in the plug detects presence of a Bluetooth device associated with service personnel, movement of the plug may not be detected as tampering of the container. However, if a Bluetooth device in the plug detects presence of a Bluetooth device associated with an unknown entity (such as a potential thief), movement (for example, the rotational or linear movement) of the plug may be detected as tampering of the container.

In an embodiment, the microcontroller unit may compare the sensed rotation of the plug to the service schedule. Optionally, the microcontroller unit may compare the sensed linear movement of the plug to the service schedule. In such instance, the memory unit of the plug may include the service schedule. Therefore, detection of tampering of the container may be entirely done by the plug.

DETAILED DESCRIPTION OF THE DRAWINGS

Referring to FIG. 1, illustrated is a block diagram of a system 100 for detecting tampering of a container 102, in accordance with an embodiment of the present disclosure. The container 102 includes a plug 104 on a lid of the container 102. Further, the plug 104 of the container 102 communicates with a server 106 through a network 108. The plug 104 and the server 106, each include communication means compatible with the network 108.

Figure 2:
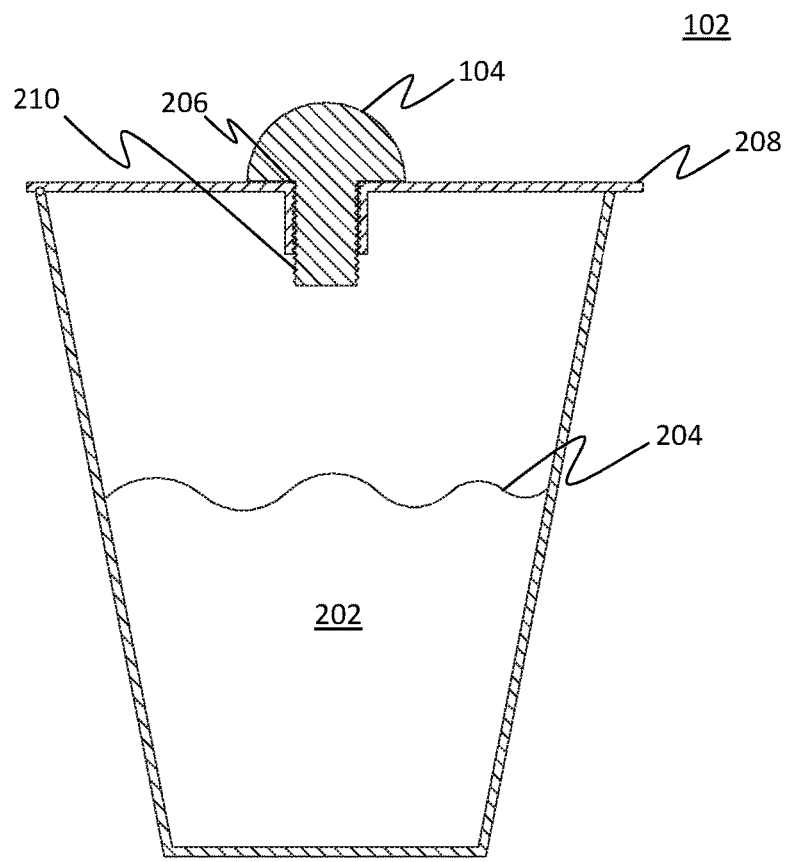
FIG. 2 is a schematic sectional view of the container of FIG. 1, in accordance with an embodiment of the present disclosure.

Referring to FIG. 2, illustrated is a schematic sectional view of the container 102 of FIG. 1, in accordance with an embodiment of the present disclosure. The container 102 includes items 202 (for example, waste or garbage) depicting a fill level 204 within the container 102. The container 102 further includes the plug 104 attached to an opening 206 in a lid 208 of the container 102. Specifically, an attachment means 210 attaches the plug 104 to the opening 206 of the container 102 by rotating the plug 104 with respect to the lid 208 of the container 102.

Figure 3:
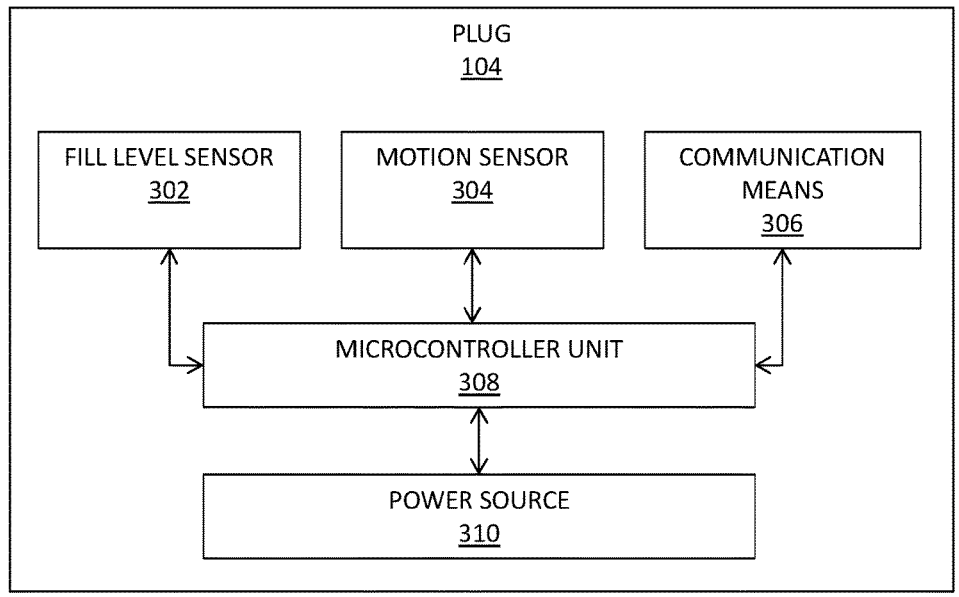
FIG. 3 is a block diagram of a plug, in accordance with an embodiment of the present disclosure.

Referring to FIG. 3, illustrated is a block diagram 300, of the plug 104 (shown in FIGS. 1 and 2), in accordance with an embodiment of the present disclosure. The plug 104 includes a fill level sensor 302, a motion sensor 304, communication means 306, a microcontroller unit 308, and a power source 310. As shown, the fill level sensor 302, the motion sensor 304, and the communication means 306 are operatively connected to the microcontroller unit 308. Therefore, the microcontroller unit 308 controls operation of the fill level sensor 302, the motion sensor 304, and the communication means 306. The power source 310 provides electrical power to the microcontroller unit 308. Further, the microcontroller unit 308 controls the electrical power from the power source 310 to the fill level sensor 302, the motion sensor 304, and the communication means 306.

Figure 4:
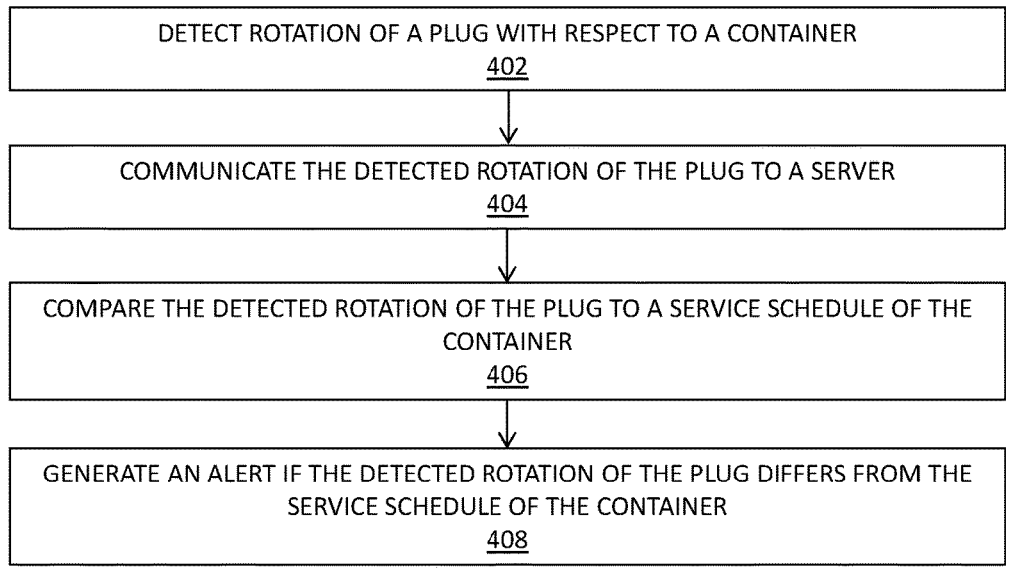
FIG. 4 illustrates steps of a method for detecting tampering of a container, in accordance with an embodiment of the present disclosure.

Referring to FIG. 4, illustrated are steps of a method 400 for detecting tampering of a container, in accordance with an embodiment of the present disclosure. Specifically, the method 400 illustrates the steps for detecting tampering of the container 102, explained in conjunction with FIGS. 1-3. At step 402, a rotation of a plug with respect to a container is detected. At step 404, the detected rotation of the plug is communicated to a server. At step 406, the detected rotation of the plug is compared to a service schedule of the container. At step 408, an alert is generated if the detected rotation of the plug differs from the service schedule of the container.

The steps 402 to 408 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A plug for detecting tampering of a container, the container comprising a lid member that includes an opening, the plug configured to be disposed within and close the opening in the lid of the container, the plug comprising:
    a connecting device configured to attach the plug to the opening in the lid of the container;
    a motion sensor configured to sense a rotation of the plug with respect to the container and the lid of the container,
    a communication device configured to communicate with a server over a network;
    a fill level sensor for sensing the fill level of the container;
    a microcontroller unit communicatively coupled to the motion sensor, the communication device and the fill level sensor;
    a memory unit coupled to the microcontroller unit, the memory unit configured to store a service schedule of the container that is communicated by the server;
    wherein the microcontroller unit is configured to compare a sensed rotation of the plug to the service schedule and detect the tampering of the container based on the comparison.

2. The plug according to claim 1, wherein the microcontroller is configured to generate an alert when the microcontroller detects tampering of the container.

3. The plug according to claim 1, wherein the connecting device comprises a threaded insert or a turnlock.

4. The plug according to claim 3, wherein the plug is attached to the opening in the lid of the container by rotating the plug in the threaded insert relative to the container for at least 180 degrees.

5. The plug according to claim 3, wherein the plug is attached to the opening in the lid of the container by rotating the plug in the turnlock relative to the container for at least 90 degrees.

6. The plug according to claim 1, wherein the motion sensor is at least one of an accelerometer, a magnetometer and a gyroscope.

7. The plug according to claim 1, wherein the motion sensor is further configured to sense linear movement of the plug with respect to the container and the lid of the container.

8. The plug according to claim 7, wherein the linear movement is in a direction essentially perpendicular to a plane defined by the rotation of the plug with respect to the container.

9. The plug according to claim 1, wherein the connecting device is configured to enable the plug to be attached to the lid in a snapfit connection, and detachment of the plug requires rotation of the plug.

10. The plug according to claim 1, wherein the fill level sensor is configured to authenticate the service schedule.

11. The plug according to claim 1, wherein the fill level sensor is at least one of an ultrasonic sensor, an infrared sensor, a pressure sensor, a weight sensor, an ultra wideband radar sensor, a camera sensor and a laser sensor.

12. The plug according to claim 1, wherein the plug further comprises a power source that is configured to power the microcontroller.

13. The plug according to claim 1, wherein the lid is disposed on a top or a bottom of the container.

14. The plug according to claim 1, wherein the plug further comprises an accelerometer that is configured to detect an acceleration value of the plug and wherein the microcontroller is further configured to detect the tampering of the container based on the acceleration value.

15. The plug according to claim 1, wherein the communication device is a transceiver unit.

16. The plug according to claim 1, wherein comparing the sensed rotation of the plug to the service schedule by the microcontroller comprises comparing the sensed motion of the plug to preplanned motions of the plug as defined by the service schedule and identifying deviations between the sensed motion of the plug and the preplanned motions of the plug.

17. The plug according to claim 16, wherein the microcontroller is configured to use the deviations to identify tampering of the container based on the deviations and generate the alert.

* * * * *